United States Patent [19]
Hoke

[11] 3,854,801
[45] Dec. 17, 1974

[54] ADJUSTABLE EYEGLASS TEMPLE

[76] Inventor: Neil A. Hoke, Federal Hwy. 224, Bloomville, Ohio 44818

[22] Filed: July 11, 1973

[21] Appl. No.: 378,193

[52] U.S. Cl. .................................. 351/118, 351/113
[51] Int. Cl. .......................... G02c 5/20, G02c 5/16
[58] Field of Search .............. 351/118, 119, 113, 19; 403/109, 118

[56] References Cited
UNITED STATES PATENTS
2,512,985  6/1950  Tveten ........................... 403/109 X
3,649,107  3/1972  Hoffmaster et al. ................. 351/118

Primary Examiner—Paul A. Sacher
Attorney, Agent, or Firm—John N. Randolph

[57] ABSTRACT

A bipartite eyeglass temple including a front section attached to an eyeglass frame and a rear section terminating in an ear engaging portion. Said front and rear sections are adjustably connected together so that the length of the temple can be varied to most comfortably accommodate the temple to a particular wearer. In addition, the rear section can be adjusted to vary the tension of a resilient means which yieldably urges said rear section forwardly for holding its rear part in engagement with the ear. The rear section may also be rotatably adjusted for conformably and most comfortably engaging the head behind the ear.

2 Claims, 4 Drawing Figures

PATENTED DEC 17 1974 3,854,801
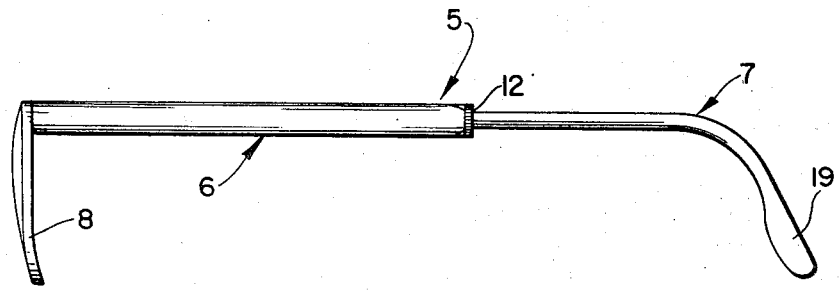
FIG. 1
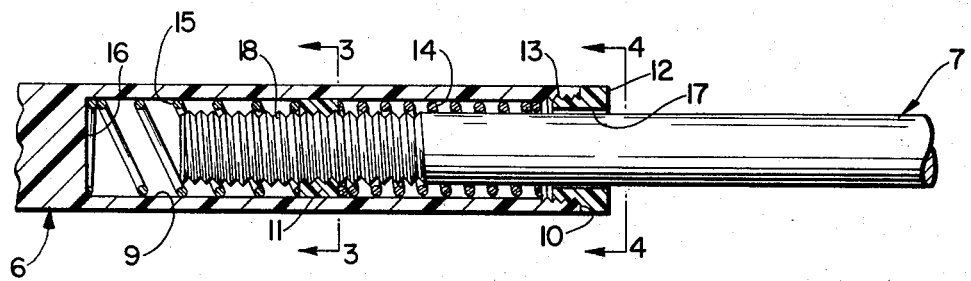
FIG. 2
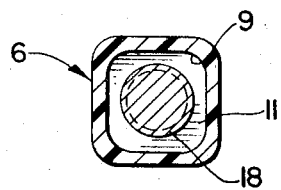 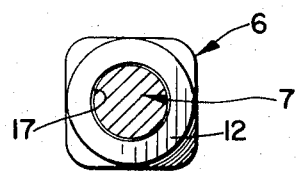
FIG. 3  FIG. 4

ADJUSTABLE EYEGLASS TEMPLE

SUMMARY

It is a primary object of the present invention to provide an adjustable eyeglass temple formed of a front section and a rear section, which may be readily adjusted to vary the length thereof and to increase or decrease a spring tension tending to foreshorten or reduce the overall length of the temple, to retain its rear end in snug engagement with the ear of the user.

Another object of the invention is to provide a temple the rear section of which will either rotatably adjust itself or may be rotatably adjusted to most comfortably position the ear engaging part of the temple relative to the user's ear and head.

Still a further object of the invention is to provide a temple which may be economically manufactured, which will be durable and efficient in use, which will not become entangled with the hair of the user, and which will be of a size, shape and appearance similar to a conventional temple.

Various other objects and advantages of the invention will hereinafter become more fully apparent from the following description of the drawing, illustrating a presently preferred embodiment thereof, and wherein:

BRIEF DESCRIPTION OF THE DRAWING

FIG. 1 is a side elevational view of an eyeglass showing one end of the lens frame with the temple attached thereto;

FIG. 2 is an enlarged fragmentary longitudinal sectional view, partly in elevation, of the adjustable temple, and FIGS. 3 and 4 are cross sectional views, taken substantially along planes as indicated by the lines 3—3 and 4—4, respectively, of FIG. 2.

DESCRIPTION OF THE PREFERRED EMBODIMENT

Referring more specifically to the drawing, the eyeglass temple in its entirety, as illustrated in FIG. 1, is designated generally 5 and is of bipartite construction including a forward section 6 and a rear section 7. The forward end of the forward section 6 is hinged, in a conventional manner, not illustrated, to the lens frame 8.

As seen in FIG. 2, the front section 6 has an elongated socket or recess 9 which opens outwardly of the other rear end 10 thereof and which is of non-circular cross section, as seen in FIG. 3. A nut 11 conformably fits slidably and non-rotatably in the bore of the recess 9. A cap 12 is threadedly connected, as seen at 13, to the rear end 10 of the recess or socket 9. A coiled compression spring 14 is disposed in the recess 9 between the cap 12 and nut 11 and a second, weaker coiled compression spring 15 is disposed in the recess 9 between the nut 11 and the closed or inner forward end 16 of the recess 9. The cap 12 has a central bore 17 sized to allow the forward portion of the rear temple section 7 to pass freely therethrough, including a threaded forward end 18 thereof which threadedly engages through the nut 11. The spring 14 is disposed around a part of the temple section 7 which extends between the nut 11 and cap 12, and a part of the spring 15 is disposed around the forward part of the threaded portion 18. The other rear end of the temple section 7 is bent or curved and shaped to provide an ear engaging portion 19 of any desired or conventional shape.

From the foregoing, it will be readily apparent that the rear temple section 7 may be rotated relative to the forward section 6 for threading its portion 18 in either direction through the nut 11 to either extend or retract said rear section 7 for varying the overall length of the temple 5. Depending upon the extent of said adjustment, the amount of pull that will be required upon the section 7 to extend it relatively to the section 6 against the compression of the spring 14, so that portion 19 can be engaged behind the ear, will determine the amount of pressure that the part 19 will exert on the ear and how tight the eyeglass will be held applied to the user. The spring 15 functions to cushion forward movement of the temple section 7 and nut 11 relative to the section 6, when the section 7 is disengaged from the ear. The spring 15 also holds the nut 11 against sliding movement forwardly of the recess 9, to maintain a a desired adjustment of the temple sections. In addition, section 7 can be rotatably adjusted slightly in either direction to cause the part 19 to most comfortably engage behind the ear and against the head. In fact, the section 7 will often rotatively adjust itself automatically as a result of the part 19 applying pressure to either the head or the ear.

It will be understood that only one of a pair of temples 5 has been illustrated and described, each of which will be individually adjusted in the same manner as heretofore described.

Various modifications and changes are contemplated and may be resorted to, without departing from the function or scope of the invention.

I claim as my invention:

1. An eyeglass temple comprising a rear section and a front section having a forward and a rear end and provided with an elongated recess opening outwardly of said rear end, a nut slidably and non-rotatably engaging in said recess, a cap detachably connected to the rear end of said front section, a compression spring confined between the nut and cap, said rear section having a forward and a rear end, said cap having a bore slidably and rotatably receiving said forward portion of said rear section, said forward portion extending through said spring and including a threaded forward end threadedly engaging in said nut and rotatable therein for varying the overall length of the temple, and said rear section having a rear end adapted to engage behind the ear of the user.

2. An eyeglass temple as in claim 1, and a second weaker compression spring disposed between said nut and the closed inner end of the recess and surrounding a part of said threaded portion for limiting forward displacement of the nut and rear temple section under the biasing action of said first mentioned spring for normally retaining the nut in a predetermined position in said recess to maintain a selected overall length of the temple.

* * * * *